May 11, 1937. H. RUSCH 2,080,094
AIRSHIP
Filed July 11, 1936 7 Sheets-Sheet 3

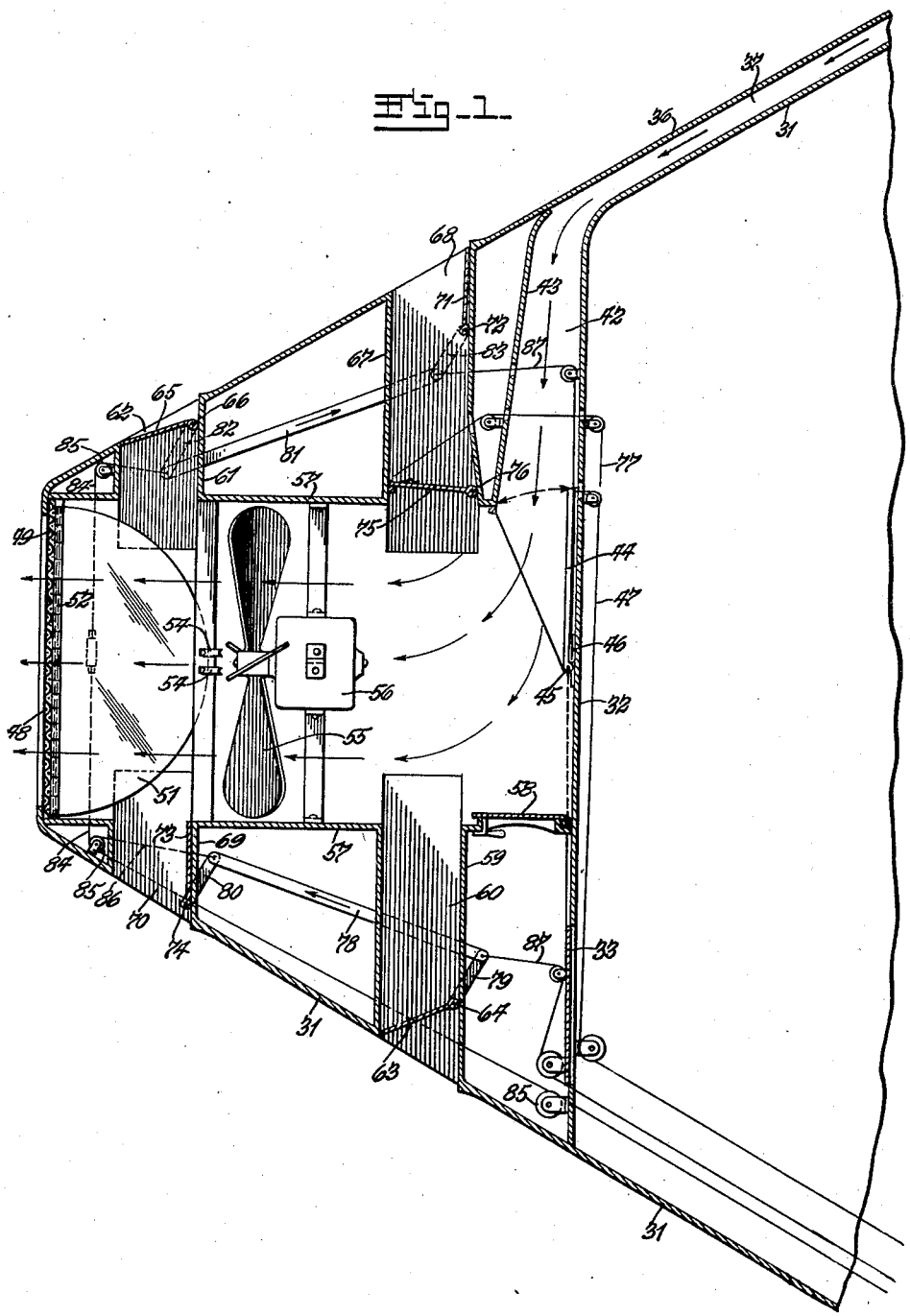

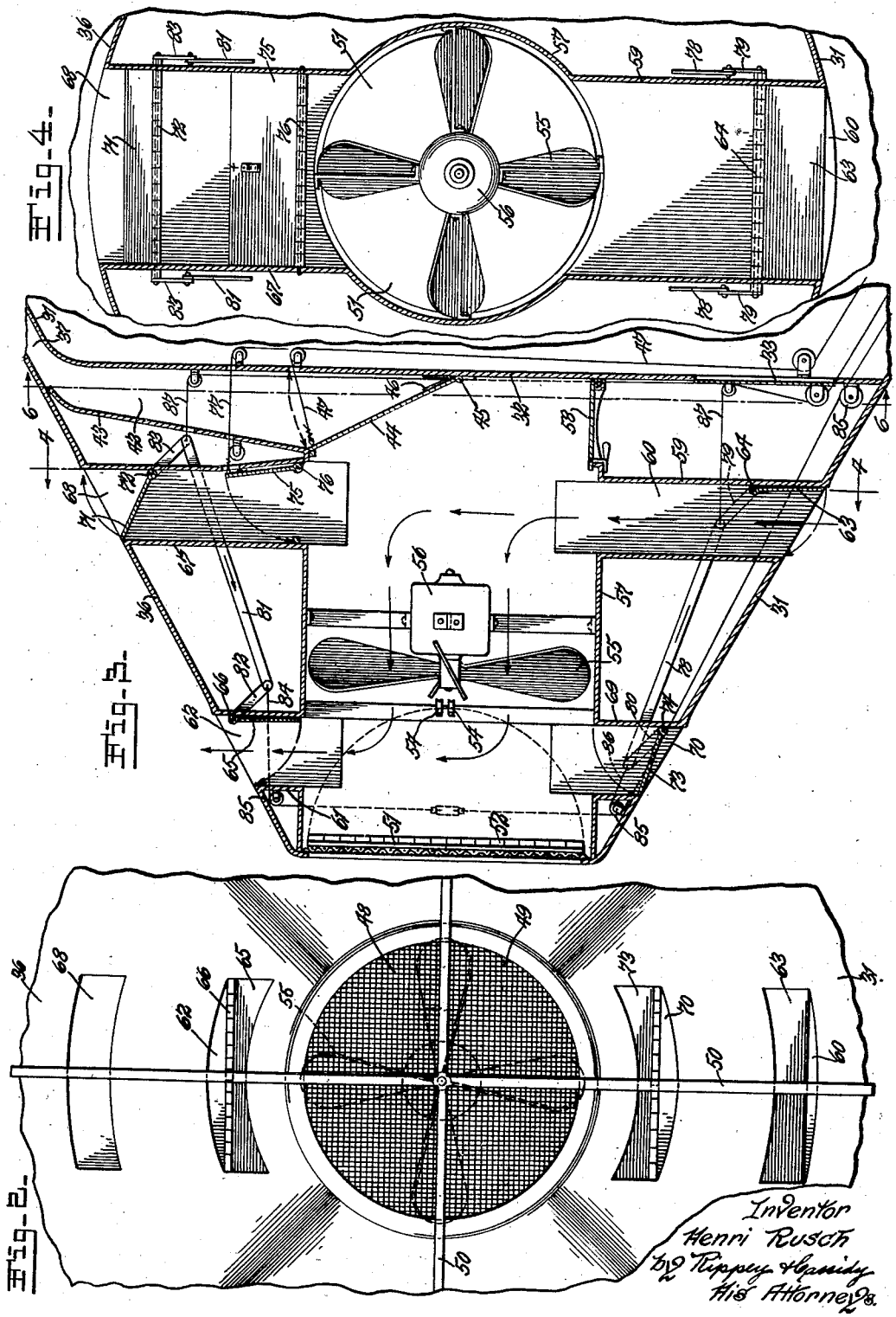

Inventor
Henri Rusch
by Rippey & Cassidy
His Attorneys.

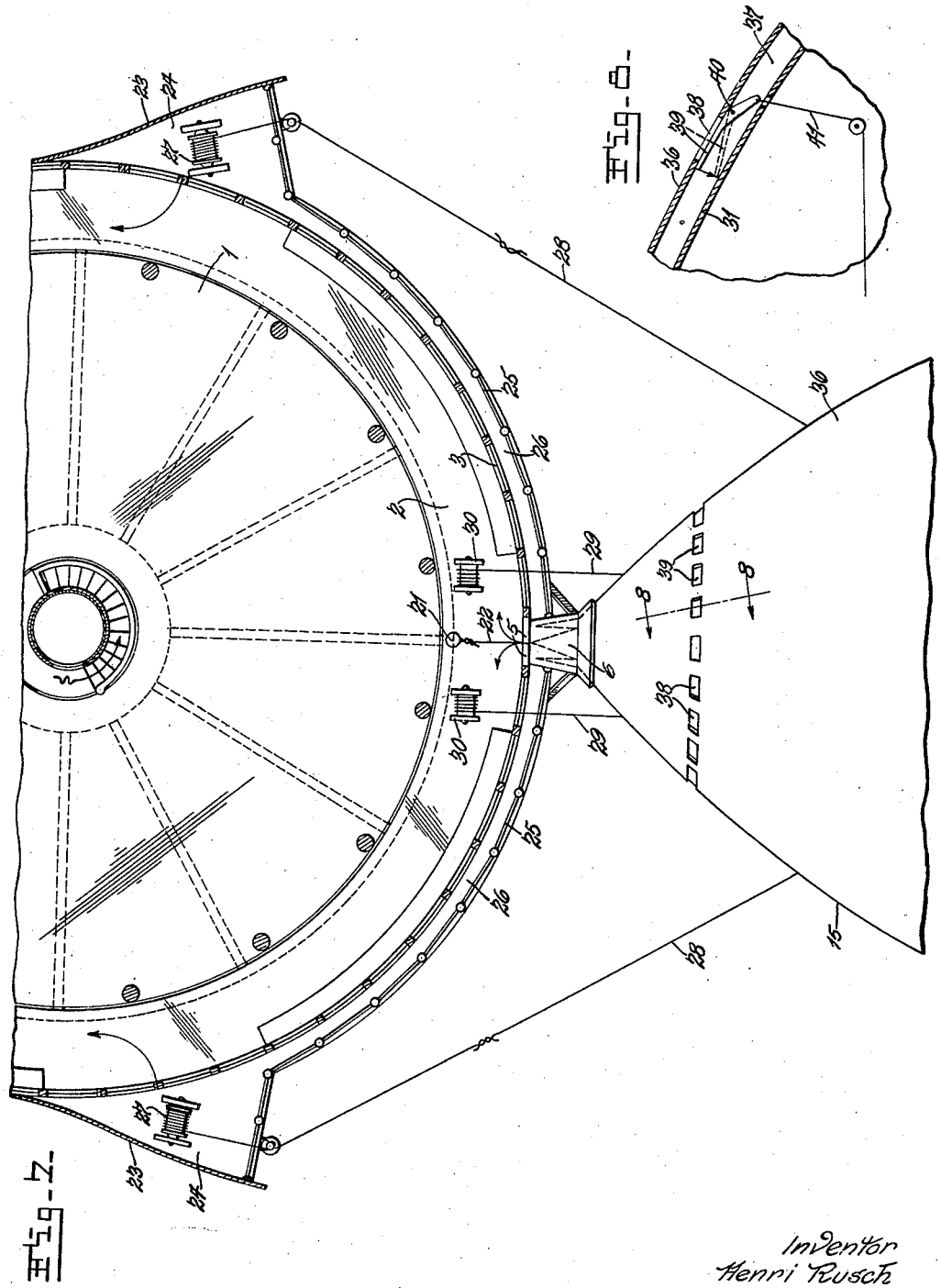

May 11, 1937.  H. RUSCH  2,080,094
AIRSHIP
Filed July 11, 1936  7 Sheets-Sheet 5

Inventor
Henri Rusch
by Rippey & Cassidy
His Attorneys

May 11, 1937.   H. RUSCH   2,080,094
AIRSHIP
Filed July 11, 1936   7 Sheets-Sheet 6

Inventor
Henri Rusch
by Rippey & Cassidy
His Attorneys.

May 11, 1937.　　　　　H. RUSCH　　　　　2,080,094
AIRSHIP
Filed July 11, 1936　　　　7 Sheets-Sheet 7

Inventor
Henri Rusch
by Rippey & Cassidy
His Attorneys

Patented May 11, 1937

2,080,094

UNITED STATES PATENT OFFICE 2,080,094

AIRSHIP

Henri Rusch, St. Louis, Mo.

Application July 11, 1936, Serial No. 90,078

20 Claims. (Cl. 244—73)

This invention relates to airships, and has special reference to airships of the lighter-than-air type.

Objects of the invention are to provide construction in an airship of the lighter-than-air type making possible easier and less expensive landings, and also increasing the safety factor during navigation of the airship; to provide means for preventing undue loss of gas during variations in weather conditions; to provide means for stabilizing the position of the airship during the time that it is moored for receiving or discharging passengers and cargo, or for other purposes; to provide means for substantially controlling and stabilizing the temperature of the upper portion of the airship in which the gas is confined in order to prevent excessive heating of gas, and to draw off any gases that might escape into the circulating air space provided for this temperature control; to provide means for storing warm air about the upper portion of the airship in cold or frigid temperatures so as to discharge from the airship most of the deposits of snow or ice that might otherwise accumulate thereon; to provide improved means for controlling the flow of air into and through a confined and enveloping space about the upper portion of the airship; and to provide improved means for mooring the forward end of the airship while the position of the rear portion of the airship is substantially stabilized as mentioned.

Various other objects and advantages of the invention should be readily apparent from the following description, reference being made to the annexed drawings, in which—

Fig. 1 is a vertical sectional view of the rear end of the airship illustrating the stabilizing devices and a portion of the temperature control space and mechanism.

Fig. 2 is a rear end elevation of a sufficient portion of the airship to illustrate important features of the present invention.

Fig. 3 is a vertical sectional view similar to Fig. 2 showing a supply or current of air being drawn through a lower inlet space and exhausted through an upper outlet space for the purpose of stabilizing the position of the rear end of the airship with respect to the front end.

Fig. 4 is a vertical crosssectional view of the rear end portion of the airship approximately on the line 4—4 of Fig. 3.

Fig. 5 is a horizontal sectional view at right angles to the section on which Fig. 3 is taken.

Fig. 7 is a view, largely diagrammatic, illustrating the mooring devices for the forward end of the airship with which the devices shown in the preceding views of the drawing cooperate to stabilize the position of the airship.

Fig. 8 is a sectional view on the line 8—8 of Fig. 7 showing the devices controlling the inlet of air into the confined space at the upper portion of the airship.

Figure 5:
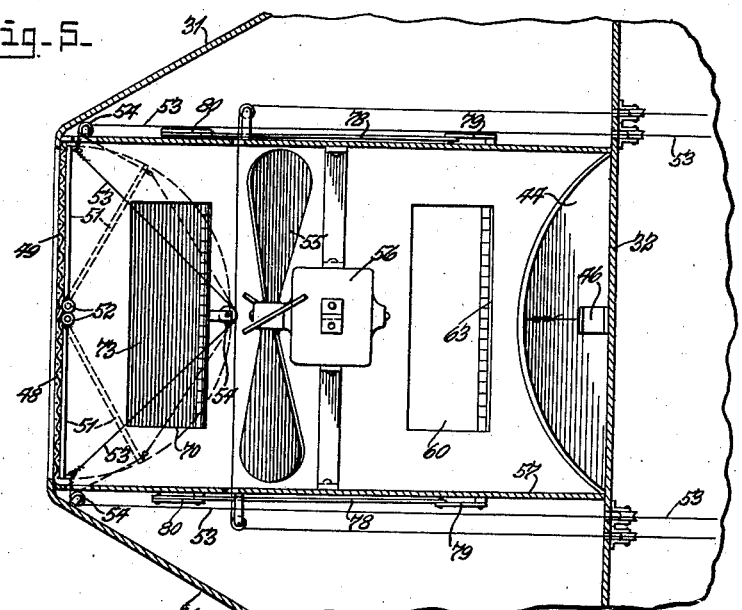

An improved dirigible passenger station to which rigid lighter-than-air airships may be moored is disclosed in my prior Patent No. 2,040,535, granted May 12, 1936. Certain of the structure of that improved dirigible passenger station is shown in Figs. 7, 11, 12 and 13 of the annexed drawings. The station comprises a stationary circular floor 1 (Figs. 7 and 13) surrounded by an annular rotary floor 2 supporting an enclosing wall 3 and having a door opening 4 for the accommodation of passengers boarding and leaving the airship. The door opening 4 is provided with doors 5. An enclosure is formed around the door opening 4 by an outwardly flaring wall 6 which is circular in cross-section and which has its inner end attached to the wall 3. A plurality of elastic cushions 7, preferably of rubber or the like and hollow so as to contain air and therefore function as pneumatic cushions, are attached to the inside of the wall structure 6. The outer end of the wall structure 6 supports a pneumatic cushion 8 having flanges 9 engaged by clamping structure 10 rigid with the outer end of the wall 6. The inside of the wall structure 6 also supports wall sections 11, as fully disclosed in my said prior patent.

Figure 9:
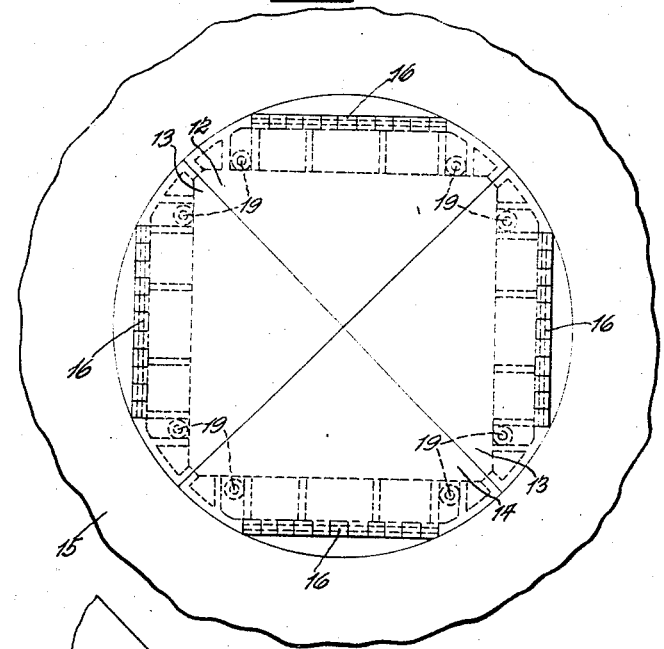
Fig. 9 is an elevation of the front end of the airship.
Figure 10:
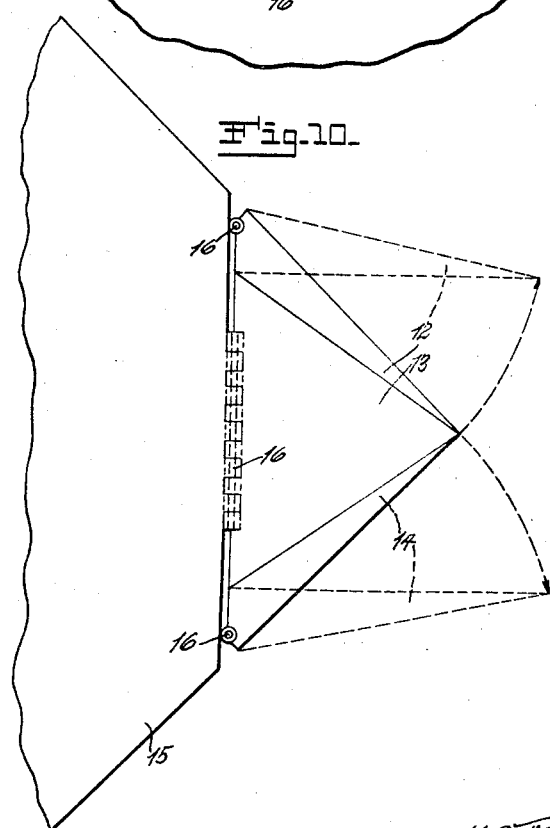
Fig. 10 is a side elevation showing, in solid lines, the forepart of the airship and, in broken lines, positions to which the hinged parts of the forepart of the airship are moved when the airship is moored.
Figure 11:
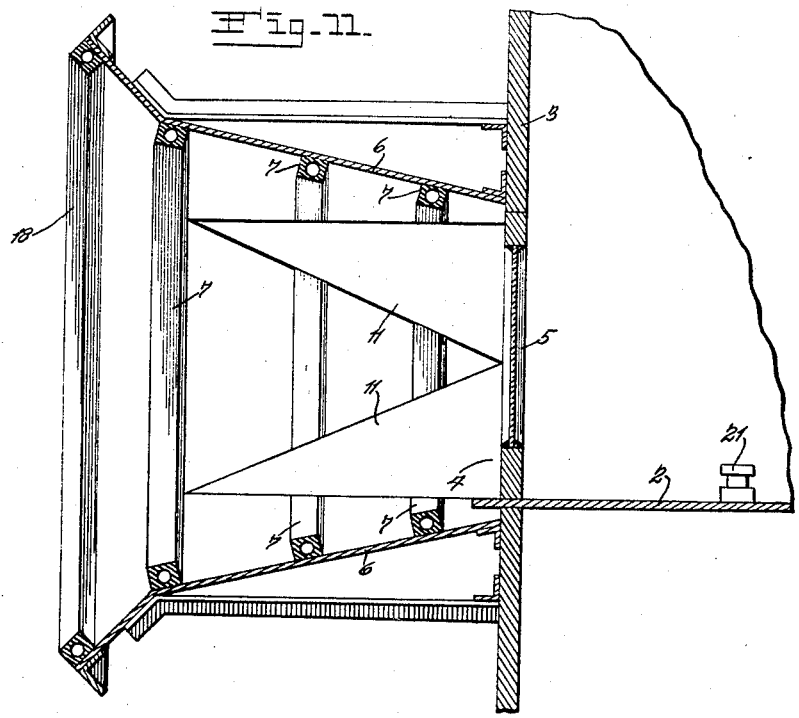
Fig. 11 is a vertical sectional view of the enclosure that receives the forepart of the airship when the airship is moored.
Figure 12:
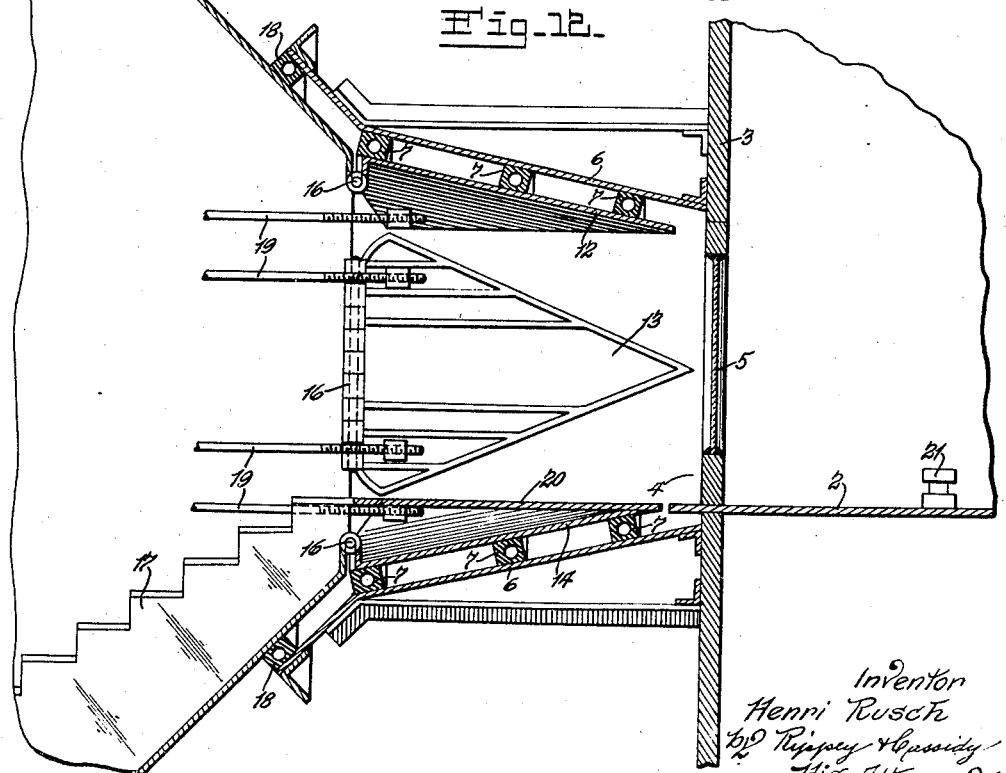
Fig. 12 is a similar vertical sectional view of said enclosure, and also showing in section the forepart of the airship extending into said enclosure.
Figure 13:
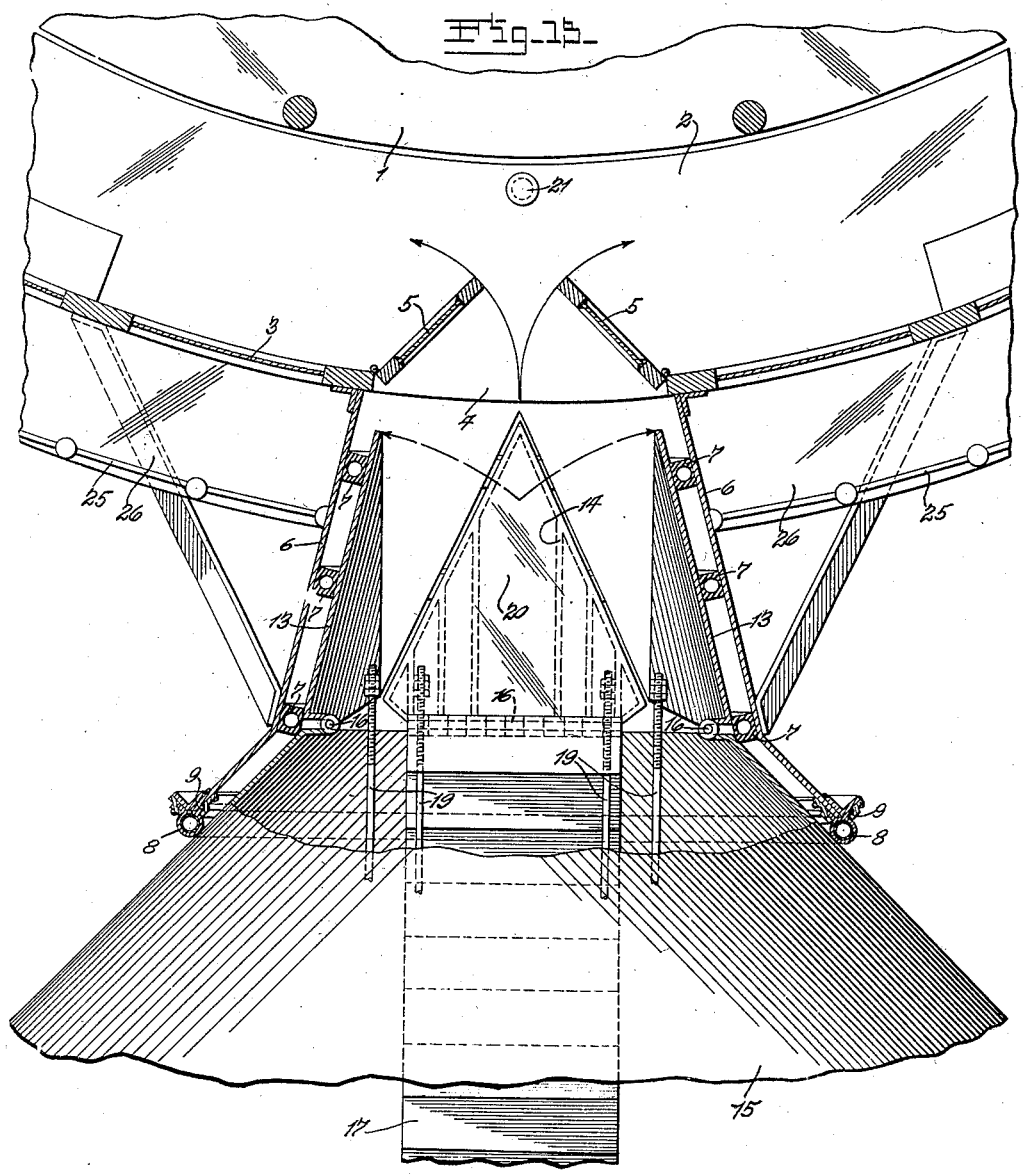
Fig. 13 is a horizontal sectional view of the parts shown in Fig. 12.
Figure 14:
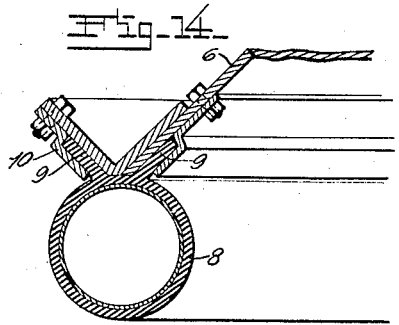
Fig. 14 is a sectional view showing one of the elastic cushioning devices forming a part of the mooring structure of the airship.

The front end or nose of my improved airship as shown comprises four transversely curved conical plates including a top plate 12, two side plates 13 and a bottom plate 14 connected to the body of the airship 15 by hinge devices 16. These curved triangular plates may be moved to position in which they form a pointed end or nose for the airship (Figs. 9 and 10), or may be swung apart to provide an opening through which passengers may board or leave the airship (Figs. 12 and 13). A combined stairway and passage 17 leads from the passenger compartment of the airship to the opening provided by the hinged triangular doors or members 12, 13 and 14. The forward end of the body of the airship extends into the opening provided by the wall structure already described and engages against the elastic cushion 8 or its analogue 18 (Fig. 12). Rotary operating connections 19 extend from the control room of the airship to connection with the respective curved and pointed doors or members 12, 13 and 14 so that said doors or members may be simultaneously operated by an appropriate operating device (not shown) for rotating the rods 19.

The lower door member 14 supports a flat wall or floor element 20 which, when the airship is moored, is in horizontal alinement with the floor 2 of the mooring device. The mooring device carries a rigid capstan 21 to which a central mooring cable 22 (Fig. 7) connected with the airship may be attached.

As shown, the mooring device further comprises diverging relatively wide walls 23 sustained in a rigid relationship with respect to the rotary floor 2 and enclosing wall 3. These walls 23 cooperate with the wall 3 to form spaces 24 the floors of which comprise extensions of the rotary floor member 2. Rails 25 rigidly supported by an outwardly extended portion of the rotary floor member 2 form aisles or passages 26 from the door opening 4 to the respective spaces 24. Winch mechanism 27 is operatively supported in each space 24 to engage and wind up cables 28 diverging from the front portion of the airship but substantially rearwardly from the front end thereof (Fig. 7). These winches 27 are operative to wind up and tighten the ropes, wires or cables 28 to assist in stabilizing the position of the airship when moored to the station. Other ropes, wires or cables 29 may extend forwardly from the airship between the ropes, wires or cables 28 and at the sides of the cable 22 to be engaged and wound up by winch mechanisms 30. When all of these ropes, wires or cables are tightened, the airship will be held extending to the leeward since the wind or air currents flowing and pressing against the outer surfaces of the walls 23 will turn the rotary floor and mooring device about the vertical axis of the mooring station. I have not herein specifically illustrated the means for rotatively supporting the rotary floor 22 because an appropriate means for supporting the same is adequately disclosed in my said prior Patent No. 2,040,535. Neither are specific means for operating the capstan 21, the winch mechanisms 27 and the winch mechanisms 30 precisely shown, because such means are well known and understood and do not require detailed illustration or description for an understanding of the invention.

Important features of the invention, useful for stabilizing the position of a rigid lighter-than-air type airship moored as aforesaid to prevent undesired oscillation or movement of the rear end of the airship with respect to the firmly moored and anchored forward end, are illustrated in Figs. 1 to 8, inclusive, of the drawings. As there shown, the enclosing wall comprises a confining envelope 31 for the gas or the gas containers or compartments by which the airship is elevated and sustained at proper elevation for flight. This enclosing wall or confining envelope 31 for the gas encloses all of the gas compartments and includes (Figs. 1, et seq.) a rear wall 32 for the space in which the gas compartments are supported, and it should be understood that the wall 32 is not a wall for a gas confining compartment and functions otherwise as a rear wall for the space containing all of the separately walled compartments in which the gas is confined, so that a door 33 may be provided for opening and closing a passage through the wall 32 for the accommodation of mechanicians and workmen entering and leaving the space in the airship rearwardly beyond the wall 32. This door 33 (Fig. 6) may be supported on hinges 34 for swinging movements to and from closed and open positions and may be held in closed position by any suitable manipulative holder 35.

Figure 6:
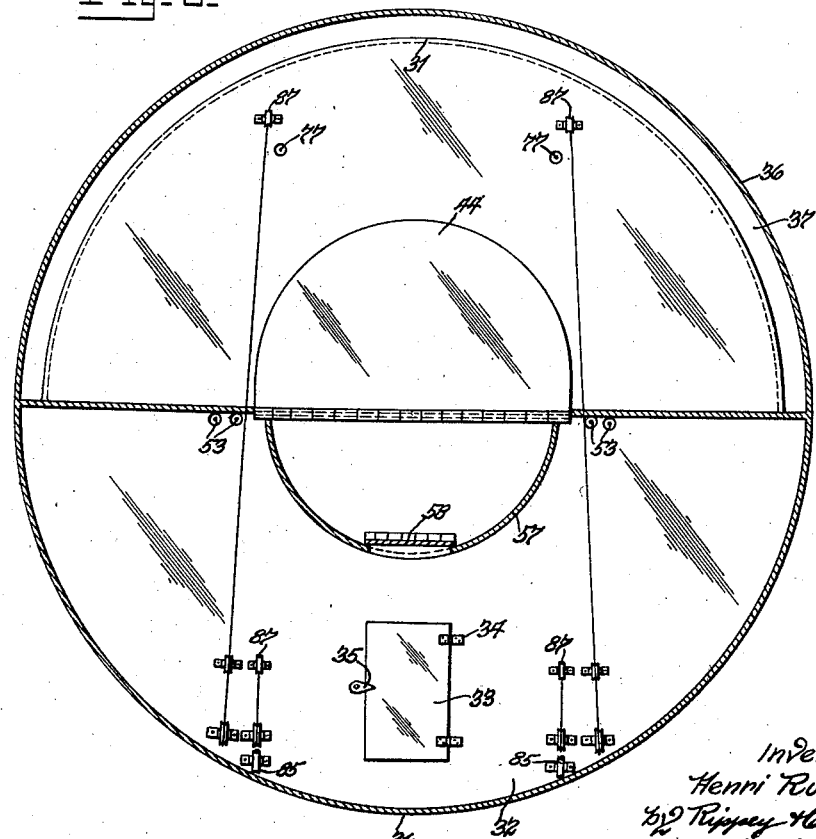
Fig. 6 is a vertical transverse sectional view on the line 6—6 of Fig. 3.

The rear end portion of the airship beyond the wall 32 includes a continuation of the wall 36 which cooperates with the wall 31 to form a space 37 which is arcuate in cross-section (Fig. 6). This space 37 extends nearly the full length and about one-half of the circumference of the airship, and is located at the upper side thereof. Near the forward end of the airship a number of openings 38 through the wall 36 open into the space 37 to admit air into said space 37 as desired. Some or all of the openings 38 are provided with closure doors 39 (Fig. 8) located in the space 37 and mounted on pivots 40. Flexible connections 41 extend from the respective doors 39 to the control room of the airship, so that said doors may be moved to and held in closed positions as desired. At the rear of the airship the space 37 opens at the rear of the wall 32, a continuation 42 of said space 37 being formed by the wall 32 and a cooperating wall 43 (Figs. 1 and 3). The lower end of the space 42 is controlled by a door 44 mounted on a hinge 45 and actuated to closed position by a spring 46 and to open position by a flexible connection 47 extending from the control room of the airship and having one end attached to said door 44. In Fig. 1, the door 44 is shown in open position to permit air to flow through the space 37 and through the continuation 42, and thence to discharge through an outlet opening 48 at the rear end of the airship which is covered by a protecting screen 49 and is crossed by the stabilizing fins 50 (Fig. 2). Doors 51 are mounted on hinges 52 and are movable to positions to open or to close the screened opening 48, as desired. Flexible connections 53 extend from the doors 51 to the control room of the airship, passing over guide rollers 54 and being freely operative to open and to close the doors. A fan or blower 55 is supported within the space formed at the rear of the wall 32 and is operated by a motor 56 to expel air through the screened opening 48 when the doors 51 and 44 are open. Thus, when the airship is aloft and passes from clouds into the heat of the sun's rays, the doors 39, 44 and 51 may be opened and a cooling current of air may be drawn through the space 37 to protect the airship and the gas sustaining it from excessive heat.

Additionally, the doors 39 and 44 may be closed to confine warm air within the space 37 when the airship is traveling through frigid temperatures and falling snow or ice particles so as to prevent the snow and the ice from becoming attached to the airship. Furthermore, the space 37 with the provisions suggested for causing currents of air to flow therethrough may be utilized to draw off and exhaust any gases that may escape from the gas compartments into the space 37, thus contributing to the comfort and safety of the passengers.

From the wall 32 to the circular opening 48 a cylindrical wall 57 extends and has an opening communicating with the space 42 and which opening is opened and closed by the door 44. Said wall 57 also has an opening that may be opened and closed by a door 58 for the accommodation of mechanicians and workmen entering and leaving the compartment formed by said cylindrical wall 57. The fan or blower 55 is mounted and supported in the compartment or passage formed by said cylindrical wall 57.

Walls 59 form a passage 60 opening to the outside at the bottom of the airship through the wall 31 into the lower side of the compartment formed by the tubular wall 57, and walls 61 form a passage 62 opening to the outside at the top of the airship through the wall 36 and into the upper side of said compartment formed by the tubular wall 57. The passage 60 is relatively close to the wall 32 while the passage 62 is nearer the rear end of the airship. A door or valve 63 is mounted on a hinge 64 in the passage 60, and a similar door or valve 65 is mounted on a hinge 66 in the passage 62. These valves or doors may be moved to closed positions, as shown in Figs. 1, or to open positions as shown in Fig. 3 of the drawings. When both doors or valves 63 and 65 are closed, air cannot flow or be drawn through the passage 60 and expelled through the passage 62; but, when both doors or valves 63 and 65 are open, as shown in Fig. 3, air may be drawn through the passage 60 and expelled through the passage 62 by the fan or blower 55 because said fan or blower is located between said passages 60 and 62.

Walls 67 form a passage 68 opening to the outside at the top of the airship through the wall 36 into the upper side of the compartment formed by the tubular wall 57, and walls 69 form a passage 70 opening to the outside at the bottom of the airship through the wall 31 and into the lower side of said compartment formed by the tubular wall 57. The passage 68 is forwardly from the fan or blower 55 and the passage 70 is rearwardly therefrom, the said fan or blower being operatively supported between said passages 68 and 70 so that it will draw air through the passage 68 and expel the air through the passage 70 when the doors 51 and 44 are closed. A door or valve 71 is mounted on a hinge 72 in the passage 68, and a similar door or valve 73 is mounted on a hinge 74 in the passage 70. These valves or doors may be moved to open positions, as shown in Fig. 1, or to closed positions as shown in Fig. 3 of the drawings. When both doors or valves 71 and 73 are closed, air cannot flow or be drawn through the passage 68 and expelled through the passage 70; but, when both doors or valves 71 and 73 are open, as shown in Fig. 1, air may be drawn through the passage 68 and expelled through the passage 70 by the fan or blower 55 because said fan or blower is located between said passages 68 and 70.

A door or valve 75 is mounted on a hinge 76 inwardly from the door or valve 71 and may be opened and closed independently of the door or valve 71 by a flexible connection 77 extending from connection with said door or valve 75 to the control room of the airship.

A link 78 has its opposite ends connected with levers 79 and 80 attached, respectively, to the hinges 64 and 74 whereby the doors or valves 63 and 73 may be operated simultaneously to close the door or valve 63 and to open the door or valve 73, and vice versa.

A link 81 has its opposite ends connected with levers 82 and 83 attached, respectively, to the hinges 66 and 72, whereby the doors or valves 65 and 71 may be operated simultaneously to close the door or valve 65 and to open the door or valve 71, and vice versa.

A flexible connection 84 extends from the lever 82 against guides 85 to the control room of the airship, and also has an extension 86 connected with the lever 80 so that the doors or valves 63 and 65 may be simultaneously opened and the door or valve 73 closed. Operation of the lever 82 by the flexible connection 84 to close the door or valve 65 simultaneously opens the door or valve 71.

Flexible connections 87 extend from the levers 79 and 83 to the control room of the airship for simultaneously opening the doors or valves 71 and 73 and simultaneously closing the doors or valves 63 and 65.

From the foregoing, it is apparent that, when the doors or valves 63 and 65 are open, the doors or valves 71 and 73 are closed. Also, the doors 51 should remain closed during the time that the doors or valves 63 and 65 are open, so that the fan or blower 55 will draw air upwardly through the passage 60 and expel the air upwardly through the passage 62 and thereby prevent the rear end of the airship from rising to an undesired extent above the moored forward end of the airship. Also, when the doors or valves 63 and 65 are closed and the passages 68 and 70 are open, and the fan or blower 55 is operating, air will be drawn downwardly through the passage 68 and expelled downwardly through the passage 70, thus preventing the rear end of the airship from descending to an undesired extent below the moored forward end.

As should be apparent from the foregoing description and by reference to Fig. 1, the doors or valves 71 and 73 are open when the doors or valves 63 and 65 are closed, and vice versa. Therefore, when it is desired to draw air through the passage 37 and to expel that air through the screened opening 48, the doors or valves 63 and 65 are maintained in closed position and the door or valve 75 is also kept closed to prevent air from being drawn through the passage 68. Only a small amount of such air, if any, will be expelled through the opening 70 when the doors 51 are open because the screened opening 48 is directly opposite the fan or blower and practically all of the air will be expelled through said screened opening.

It should now be apparent that this invention attains all of its intended objects and purposes in a practicable manner. The several elements comprising the invention occupy comparatively little space and are of comparatively light weight and, therefore, the invention is practicable. The invention may be varied within the scope of equivalent limits without departure from the nature and principle thereof as defined by the appended claims.

I claim:—

1. An airship having mooring connections extending from its front end, means forming a compartment at the rear end of the airship with passages opening to the outside at the top and at the bottom and at the rear end of the compartment respectively, means for opening and closing said passage that opens to the outside at the rear of said compartment, and mechanism for drawing air through certain of said other passages into said compartment and expelling the air through certain of said passages opening at the opposite side of the airship to stabilize the rear end of the airship with respect to the moored front end.

2. An airship of the lighter-than-air type having a confined approximately semi-circular space along the upper side of the airship, walls closing the lower ends of said space at the opposite sides of the airship, means for admitting air into said space near the front of the airship, and mechanism for causing said air to flow through said space to the rear of the airship and for expelling said air selectively in different directions at the rear of the airship.

3. In an airship of the lighter-than-air type, means forming an approximately semi-circular space along the upper side of the airship from near the front end to near the rear end, means for admitting air into said space, mechanism for discharging said air from the airship selectively in different directions, and means for confining air in said space.

4. In an airship of the lighter-than-air type, means forming a compartment near the rear end of the airship, complementary pairs of air inlet and outlet passages communicating with said compartment at the top and bottom of the airship and opening to the outside, the passages of each pair being out of alinement with each other, mechanism for opening and closing the complementary passages optionally, and mechanism for drawing air through the inlet passages into said compartment and expelling air through the complementary outlet passages at the top or bottom of the airship as desired.

5. In an airship of the lighter-than-air type, walls forming a confined approximately semi-circular space along the upper side of the airship from near the front end to near the rear end of the airship, means for admitting air into said space near the front end of the airship, and means for positively discharging air from said space selectively in different directions at the rear end of the airship.

6. In an airship of the lighter-than-air type, walls forming an approximately semi-circular space along the upper side of the airship from near the front end to near the rear end and having inlet openings near the front end of the airship, a compartment at the rear end of the airship opening into the rear end of said space and having an outlet opening at its rear end, devices for closing said openings as desired to confine air in said space, and connections for moving said devices to position to open said openings to permit air to enter said space near the front end and to be discharged from said space near the rear end of the airship.

7. In an airship of the lighter-than-air type, walls forming a confined approximately semi-circular space along the upper side of the airship from near the front end to near the rear end and having inlet openings near the front end of the airship and an outlet opening near the rear end of the airship, devices for closing said openings as desired to confine air in said space, connections for moving said devices to position to open said openings to permit air to enter said space near the front end and to be discharged from said space near the rear end of the airship, and mechanism mounted rearwardly from said outlet opening for creating a suction through said space and discharging air therefrom at the rear end of the airship.

8. In an airship of the lighter-than-air type, walls forming a compartment at the rear of the airship having an inlet opening from the lower side of the airship and an outlet opening to the upper side of the airship spaced rearwardly from said first opening, devices for opening and closing said openings as desired, and mechanism mounted in said compartment between said openings for causing air to enter said compartment through said first opening and for discharging said air from said compartment through said second opening to the upper side of the airship.

9. In an airship of the lighter-than-air type, wall structure forming a compartment at the rear of the airship having an air inlet opening from the upper side of the airship near the front of said compartment and an air outlet opening to the underside of the airship rearwardly from said first opening, devices for opening and closing said openings as desired, connections for operating said devices, and mechanism mounted in said compartment between said openings for creating a flow of air into said compartment from the upper side of the airship through said first opening and forcibly discharging said air to the underside of the airship through said second opening.

10. In an airship of the lighter-than-air type, walls forming a compartment at the rear of the airship having inlet openings from the lower and upper sides of the airship respectively and having complementary oppositely disposed outlet openings to the upper and lower sides of the airship respectively and spaced rearwardly from the respective complementary inlet openings, devices for closing the respective complementary inlet and outlet openings and for opening others of said inlet and outlet openings, and mechanism mounted between said inlet openings and said outlet openings for creating a suction of air through said inlet openings respectively and expelling said air forcibly through the complementary outlet openings to raise or lower the rear end of the airship as desired.

11. In an airship of the lighter-than-air type, walls forming a confined approximately semi-circular space along the upper side of the airship from near the front end to near the rear end of the airship, means forming passages for admitting air into said space near the front end of the airship, devices for opening and closing said passages as desired, connections for operating said devices, and means located rearwardly beyond said space for creating a flow of air through said space and for discharging said air at the rear of the airship.

12. In an airship of the lighter-than-air type, walls forming a confined approximately semi-circular space along the upper side of the airship from near the front end to near the rear end of the airship, means forming passages for admitting air into said space near the front end of the airship, devices for opening and closing said passages as desired, means forming a discharge outlet passage at the rear end of the airship, mechanism mounted between the rear end of said space and said outlet passage for creating a suction of air through said space and for expelling said air through said outlet opening, and a device mounted forwardly from said mechanism for opening and closing the rear end of said space.

13. In an airship of the lighter-than-air type, wall structure forming a compartment near the rear of the airship having an outlet opening at its rear end, means for opening and closing said outlet opening, walls forming an inlet opening from the underside of the airship into the lower portion of said space, walls forming an outlet opening from said space to the upper side of the airship rearwardly from said inlet opening, means for opening and closing said openings, and mechanism mounted between said openings for drawing air into said space through said inlet opening and expelling said air from said space through said outlet opening at the upper side of the airship to control the altitude of the rear end of the airship with respect to the front end thereof.

14. In an airship of the lighter-than-air type, wall structure forming a compartment at the rear end of the airship having an outlet opening at its rear end, doors for opening and closing said outlet opening, walls forming an inlet air passage from the underside of the airship into the lower portion of said compartment, walls forming an outlet passage from said compartment to the upper side of the airship and spaced rearwardly from said first named passage, mechanism for simultaneously opening said passages, and mechanism mounted in said compartment between said passages for drawing air into said compartment through said first named passage and expelling air from said compartment through said second passage to control the altitude of the rear end of the airship with respect to the front end.

15. In an airship of the lighter-than-air type, wall structure forming a compartment at the rear end of the airship, complementary inlet and outlet passages opening into and from said compartment in a relationship in which the inlet passages respectively open from the underside and from the upper side of the airship and their complementary outlet passages respectively open to the upper side and to the underside of the airship respectively, mechanism for opening and closing either complementary set of inlet and outlet passages as desired and for preventing both sets of inlet and outlet passages from being opened at the same time, and mechanism mounted between said inlet passages and said outlet passages for expelling through said outlet passages air admitted into said compartment through the complementary inlet passages.

16. In an airship of the lighter-than-air type, wall structure forming a compartment at the rear of the airship having an air inlet passage thereto from the underside of the airship and spaced rearwardly therefrom, an outlet passage to the upper side of the airship, doors for opening and closing said passages, connections for operating said doors to open said passages simultneously and to close said passages simultaneously, and mechanism mounted in said compartment between said passages for expelling through said outlet passage air admitted into said compartment through said inlet passage when said doors are open.

17. In an airship of the lighter-than-air type, wall structure forming a compartment at the rear of the airship having an air inlet passage thereto from the upper side of the airship and spaced rearwardly therefrom an air outlet passage to the underside of the airship, doors for opening and closing said passages, means for operating said doors simultaneously to open said passages and to close said passages as desired, wall structure forming an additional air inlet passage to said compartment from the upper portion of the airship, means forming an outlet passage at the rear of the airship for air admitted into said compartment from said last named passage, and mechanism mounted in said compartment between said two first named passages for expelling through said first outlet passage air admitted to said compartment through said first named inlet passage and for expelling through said second outlet passage air admitted to said compartment through said third passage from the upper portion of the airship.

18. In an airship of the lighter-than-air type, wall structure forming a compartment at the rear of the airship having an air inlet passage thereto from the upper side of the airship and spaced rearwardly therefrom an air outlet passage to the underside of the airship, doors for opening and closing said passages, means for operating said doors simultaneously to open said passages and to close said passages as desired, wall structure forming an additional air inlet passage to said compartment from the upper portion of the airship, means forming an outlet passage at the rear of the airship for air admitted into said compartment from said last named passage, mechanism mounted in said compartment between said two first named passages for expelling through said first outlet passage air admitted to said compartment through said first named inlet passage and for expelling through said second outlet passage air admitted to said compartment through said third passage from the upper portion of the airship, a door for opening and closing said second inlet passage, and a door for closing said first inlet passage when said second inlet passage is open.

19. In an airship of the lighter-than-air type, walls forming an approximately semi-circular space enclosing approximately the upper one-half of the airship from near the front end to near the rear end thereof, means controlling the admission of air into said space near the front end of the airship for movement toward the rear end of the airship or for confinement in said space as desired, and means controlling the discharge of air from said space in different selected directions near the rear end of the airship.

20. In an airship of the lighter-than-air type, walls forming an approximately semi-circular space enclosing approximately the upper one-half of the airship from near the front end to near the rear end thereof, means controlling the admission of air into said space near the front end of the airship for movement toward the rear end of the air ship or for confinement in said space as desired, means controlling the discharge of air from said space in different selected directions near the rear end of the airship, and mechanism for creating a flow of air through said space toward the rear end of the airship and for discharging said air at the rear end of the airship.

HENRI RUSCH.